(12) United States Patent
Cooper

(10) Patent No.: US 6,810,384 B1
(45) Date of Patent: Oct. 26, 2004

(54) METHOD AND APPARATUS FOR SALES VOLUME AND SHARE DECOMPOSITION

(75) Inventor: Jeffrey S. Cooper, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/368,184

(22) Filed: Aug. 4, 1999

(51) Int. Cl.⁷ ............................................. G06F 17/60
(52) U.S. Cl. ..................................... 705/10; 705/14
(58) Field of Search ................................ 705/10, 14

(56) References Cited

U.S. PATENT DOCUMENTS

| | | | | |
|---|---|---|---|---|
| 5,368,129 A | * | 11/1994 | Von Kohorn | 184/15.2 |
| 5,596,493 A | * | 1/1997 | Tone et al. | 705/10 |
| 5,781,893 A | * | 7/1998 | Felthauser et al. | 705/210 |
| 5,832,458 A | * | 11/1998 | Jones | 705/14 |
| 5,854,746 A | * | 12/1998 | Yamamoto et al. | 700/106 |
| 5,933,813 A | * | 8/1999 | Teicher et al. | 705/26 |
| 5,963,919 A | * | 10/1999 | Brinkley et al. | 705/28 |
| 6,029,139 A | * | 2/2000 | Cunningham et al. | 705/10 |
| 6,292,786 B1 | * | 9/2001 | Deaton et al. | 705/14 |
| 6,366,890 B1 | * | 4/2002 | Usrey | 705/10 |
| 2001/0014868 A | * | 7/1998 | Herz et al. | 705/14 |
| 2001/0047293 A1 | * | 5/2001 | Waller et al. | 705/10 |

FOREIGN PATENT DOCUMENTS

JP            07205574 A   *   1/1994   ........... B42D/15/00

OTHER PUBLICATIONS

Feary, Helen. "Watch your spending . . . " Grocer, Apr. 25, 1998 [Dialog].*
"New Methods Seen Key To Gauging Promotions," Supermarket News, Jun. 14, 1993 [Dialog].*
Robinson, William A. "The art & science of promotion evaluation," Potentials in Marketing, Apr. 1992 [Dialog].*
Parra, James. "Check out what these checkouts could tell you," Business Mexico, Mar. 1995 [retrieved from Proquest].*
Sauls, Walter. "The risks of ignoring data," USBanker, Nov. 1996 [retrieved from Proquest].*

* cited by examiner

Primary Examiner—Tariq R. Hafiz
Assistant Examiner—Catherine M. Colón
(74) Attorney, Agent, or Firm—John A. O'Toole; Bradley A. Forrest; Douglas J. Taylor

(57) ABSTRACT

Methods and systems for improved volume or share decomposition are described. A request for sales volume or share information for a particular product is sent to a database. The sales volume or share information received from the database is decomposed and casual factors are provided. In addition, the sales volume or share information, the additional decomposed sales volume or share information and the causal factors are displayed.

19 Claims, 10 Drawing Sheets

| | CONDITION INCREMENTAL CHANGE (1,749) | FEATURE W/O DISPLAY INCREMENTAL CHANGE 13,856 | DISPLAY W/O FEATURE INCREMENTAL CHANGE (7,443) | FEATURE AND DISPLAY INCREMENTAL CHANGE (4,595) |
|---|---|---|---|---|
| INCREMENTAL VOLUME CHANGE DUE TO CHANGE IN BASE VOLUME | (3,117) | (6,039) | (3,646) | (4,583) |
| INCREMENTAL VOLUME CHANGE DUE TO CHANGE IN % BASE VOLUME EXPOSURE | (4,164) | 15,103 | (6,866) | (2,282) |
| INCREMENTAL VOLUME CHANGE DUE TO A CHANGE IN % LIFT | 5,531 | 4,791 | 3,070 | 2,270 |
| % LIFT CHANGE DUE TO DEPTH OF DISCOUNT | 5,274 | 15,958 | 19,584 | 10,005 |
| INCREMENTAL VOLUME CHANGE DUE TO CHANGE IN EFFECTIVENESS | 258 | (11,167) | (16,515) | (7,736) |

METHOD AND APPARATUS FOR SALES VOLUME AND SHARE DECOMPOSITION

FIELD OF THE INVENTION

The present invention relates generally to product marketing and more specifically to a method and apparatus for sales volume and share decomposition used in conjunction with product marketing.

BACKGROUND OF THE INVENTION

In today's business world, a multitude of factors influence the sales and distribution of products. Due to such wide and mass distribution of products across the world, minor modifications in product marketing translates into amplified modifications in sales, either positively and negatively. Accordingly, it becomes extremely important to track these factors and relate them to the changes in sales. Today's marketing tools include what is termed a volume decomposition system. Simply defined, a volume decomposition system is a system for breaking down sales volume distribution of a particular product and assigning it to causal factors. One example of a causal factor could be changes in the amount and quality of advertising for a particular product.

Advantageously, this system of decomposition moves the tracking of volume from being descriptive of the situation to being prescriptive of a solution. For example, noting that the volume of a particular product is down 100 units, while being descriptive, does not provide the reasons why the volume is down. In contrast, a volume decomposition system breaks down (i.e., decomposes) this 100 unit loss to enable the improvement of the amount of sales volume for a particular product. Logically, the more the volume is decomposed by a volume decomposition system, the more precise the prescription will be.

Prior art FIG. 1 illustrates a current system of volume decomposition. In particular, FIG. 1 is a graph, wherein the y-axis is the "all commodity volume" (ACV) which is defined as the all of the volume for all of the commodities (i.e. products) sold for a particular point of distribution (e.g., a store). Self-defined, a point of distribution is defined as a location from which a product is being distributed (e.g., sold). Additionally, ACV is defined by the number of distributions for a particular product. The x-axis is the number of turns which is defined as the number of a particular product of interest that has been sold for a particular point of distribution. The variable "D1" represents the amount of distribution for a prior time period and variable "D2" represents the amount of distribution for the current time period. Similarly, the variable "T1" represents the amount of turns for a prior time period and variable "T2" represents the amount of turns in the current time period.

Using these variables, the total volume change is based on the following formula:

$$\text{Total Volume Change} = \text{Volume Change due to Turns} * \text{Volume Change due to Distribution} \quad (1)$$

In order to calculate the amount of volume change due to either the amount of distributions or the amount of turns, either the number of turns or the number of distributions are held constant. The variable that is held constant is then multiplied by the change in the other variable. For example, the following formula is used to calculate the amount of volume change due to turns:

$$\text{Volume Change Due to Turns} = D2*(T2-T1) = 10*(5-3) = 20 \quad (2)$$

Moreover, the following formula is used to calculate the amount of volume change due to distribution:

$$\text{Volume Change Due to Distributions} = T2*(D2-D1) = 5*(16-10) = 30 \quad (3)$$

Accordingly for FIG. 1, the total volume change between the prior period and the current period equals 50 (a change of 20 due to turns and a change of 30 due to distributions). However, this analysis provided by this volume decomposition system is limited, as the decomposition is limited to distributions and turns for a particular product. Accordingly, it would be desirable to improve the current volume decomposition system.

SUMMARY OF THE INVENTION

The invention includes methods and systems for improved volume and share decomposition. In one implementation, a computer sends a request for sales volume information for a particular product to a database on a remote server. The database sends the requested sales volume information back to the computer. The database sends back sales volume information that includes the incremental volume for the particular product due to different merchandising conditions (e.g., a temporary price reduction) in two different time periods. Upon receipt of this sales volume information, the computer decomposes the volume change between the two different time periods.

In one such embodiment, the computer decomposes this sales volume information for a particular product by determining the change in the incremental volume for the particular product due to a change in the base volume being exposed to a particular merchandising condition for the product across two different, yet comparable, time periods. In another embodiment, the computer decomposes this sales volume information for a particular product by determining a change in the incremental volume for the particular product due to a change in the percent of the base volume that is exposed to a particular merchandising condition of that product across two time periods.

The computer also decomposes this sales volume information for a particular product by determining a change in the incremental volume for the particular product due to a change in the lift in incremental volume of a particular merchandising condition across two time periods. In another embodiment, the computer decomposes this sales volume information for a particular product by determining a change in the incremental volume for the particular product due to a change in the price discount of a merchandising condition to which the base volume is exposed across two time periods. In a further embodiment, the computer decomposes this sales volume information for a particular product by determining a change in the incremental volume for the particular product due to a change in an effectiveness of a given level of a discount of a merchandising condition in generating lift across two time periods.

The computer also provides a number of lists of causal factors that may affect the changes in the sales volume for a particular product. In one embodiment, the computer displays the changes in the sales volume for a particular product that includes those changes decomposed by the computer as well as the lists of causal factors affecting these volume changes. Still other and further aspects and embodiments of the present invention will become apparent by reference to the drawings and by reading the following detailed description.

BRIEF DESCRIPTION OF THE DRAWINGS

FIG. 7 is a table illustrating an embodiment of volume change numbers associated with the embodiment of the display of FIG. 5.

DESCRIPTION OF EMBODIMENTS

Figure 1:
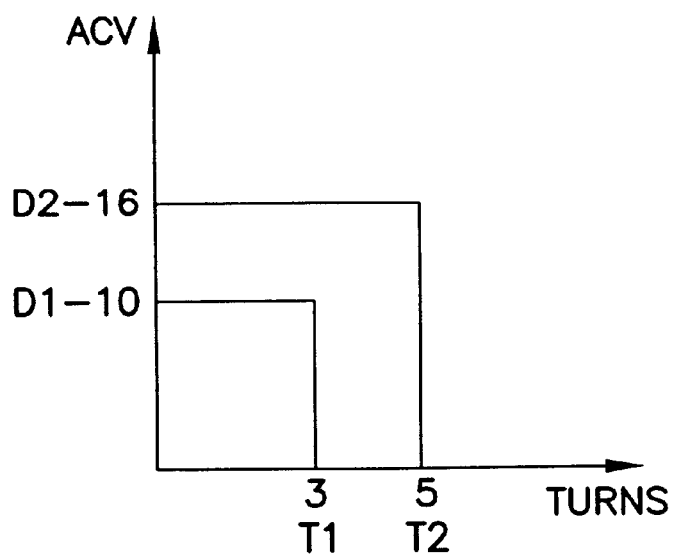
FIG. 1 is a graph, illustrating a prior art volume decomposition system.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the detailed description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Additionally in the following description, for sake of clarity, embodiments of the systems and methods of decomposition are described in terms of volume; however, the invention is not so limited, as other units may be used in decomposition. In one embodiment, another unit of analysis is a "share" which is defined as the percentage of a category of products being sold by a particular product owned by a particular company for a particular geographic market during a particular time period. Moreover, in the following description, embodiments of the systems and methods of decomposition are defined in terms of changes between different time periods. In such an embodiment, the comparison time period for any particular time period being analyzed is that particular time period in the previous period. For example, if the particular analyzed time period is the month of December for the year of 1998, the comparison period is the month of December for the year of 1997.

Figure 2:
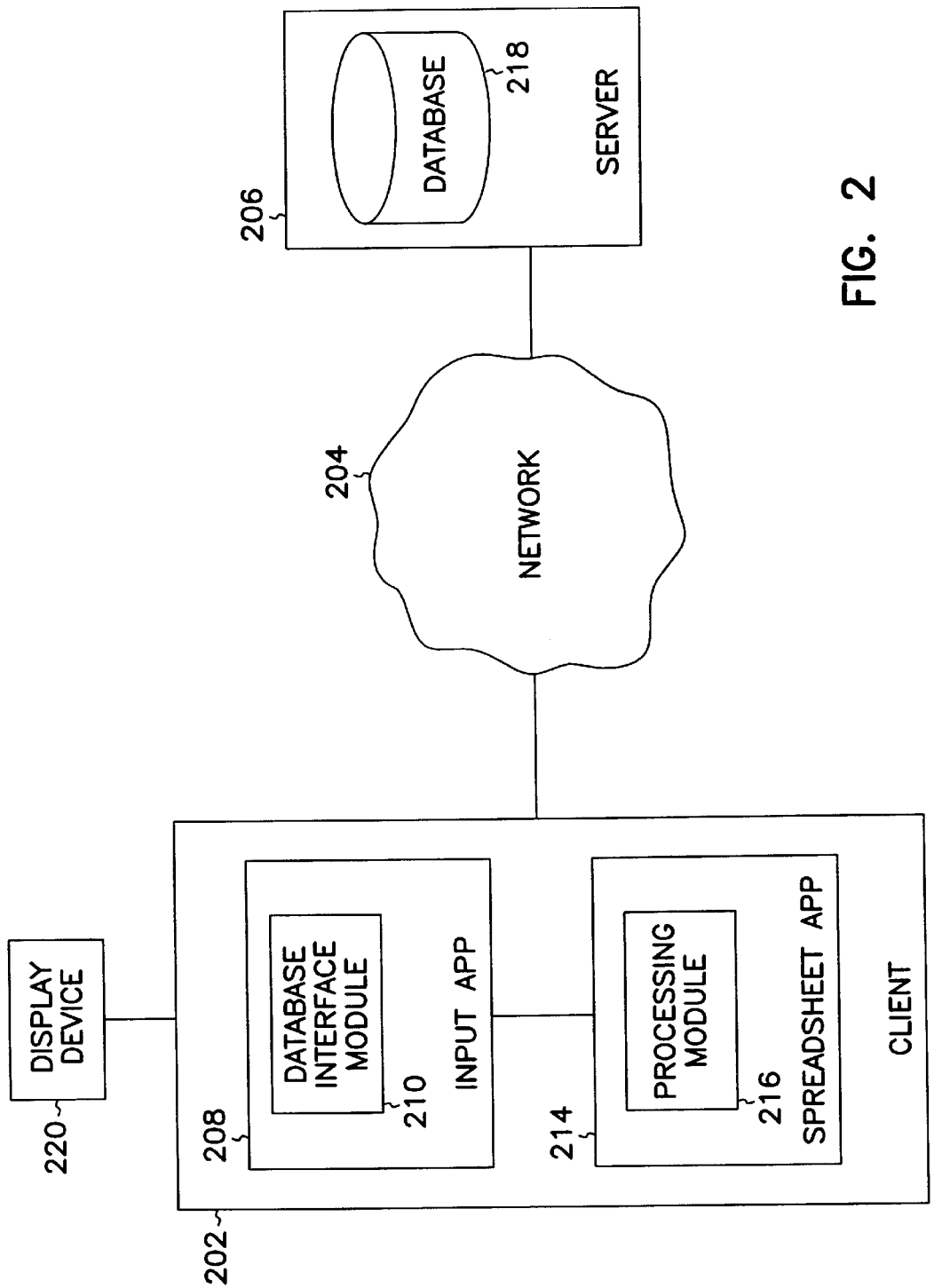
FIG. 2 is a block diagram illustrating the major components of a system embodiment of the present invention.

A system level overview of the operation of one embodiment of a volume decomposition system is described by reference to FIG. 2. In particular, FIG. 2 includes client 202, server 206, network 204 and display device 220, which are electrically and operatively coupled together. Client 202 is comprised of input application 208, which includes database interface module 210, and of spreadsheet application 214, which includes processing module 216. Moreover, server 206 includes database 218. In such an embodiment, database interface module 210 and processing module 216 are computer programs (e.g., database interface program and processing program) executed by a processor of client 202 from a computer-readable medium such as a memory thereof. Moreover, client 202 and server 206 are coupled together by network 204 (e.g., the Internet).

In one embodiment, input application 208 displays an input screen that enables a user to input various volume parameters that are to be sent database 218. In particular, input application 208 enables the user to input various parameters that are transmitted to database 218 concerning sales volume for a particular product in certain geographical regions for a particular time period. For example, the user may want sales volume concerning a particular cereal product (e.g., Wheat Chex®) sold in the state of Minnesota for the year of 1998. Once the user completes the entering of the volume parameters, database interface module 210, which is part of input application 208, receives these parameters, formats them into a request to correspond to the correct protocol for the particular database being accessed and transmits the request over network 204 to server 206 on which database 218 resides, as is well known in the art.

Once this request is received, database 218 accesses the requested sales volume information and transmits the requested sales volume information back across network 204 to client 202. In one embodiment, upon receipt of this information, client 202 activates spreadsheet application 214. One example of spreadsheet application 214 is Microsoft Excel. In this embodiment, processing module 216 includes macros in spreadsheet application 214 allowing for the manipulation of the received sales volume information and calculation of additional sales volume information. In an alternative embodiment, processing module 216 is independent of spreadsheet application 214. In such an embodiment, processing module 216 processes this sales volume information and calculates this additional sales volume information prior to activating spreadsheet application 214. In other words, processing module 216 preprocesses this sale volume information. Once processing module 216 completes this processing of the received sales volume information and this calculation of additional sales volume information, spreadsheet application 214 displays this received and processed sales volume information for the particular product on display device 220.

A system level overview of the operation of another embodiment of a volume decomposition system is described by reference to FIG. 3. In particular, FIG. 3 includes database interface module 302, processing module 304, display device 306 and a database 308; all operatively coupled together. In one embodiment, database interface module 302 and processing module 304 are part of a computer, although the invention is not so limited. In such an embodiment, database interface module 302 and processing module 304 are computer programs (e.g., database interface program and processing program) executed by a processor of the computer from a computer-readable medium such as a memory thereof. In a further embodiment wherein these modules are computer programs that are part of a computer, the computer and database 308 are connected by a network, such as the Internet. Those of ordinary skill in the art will appreciate that the volume decomposition system in FIG. 3 may also include other components not shown in FIG. 3; only those parts necessary to describe embodiments of the invention in an enabling manner are provided.

Figure 3:
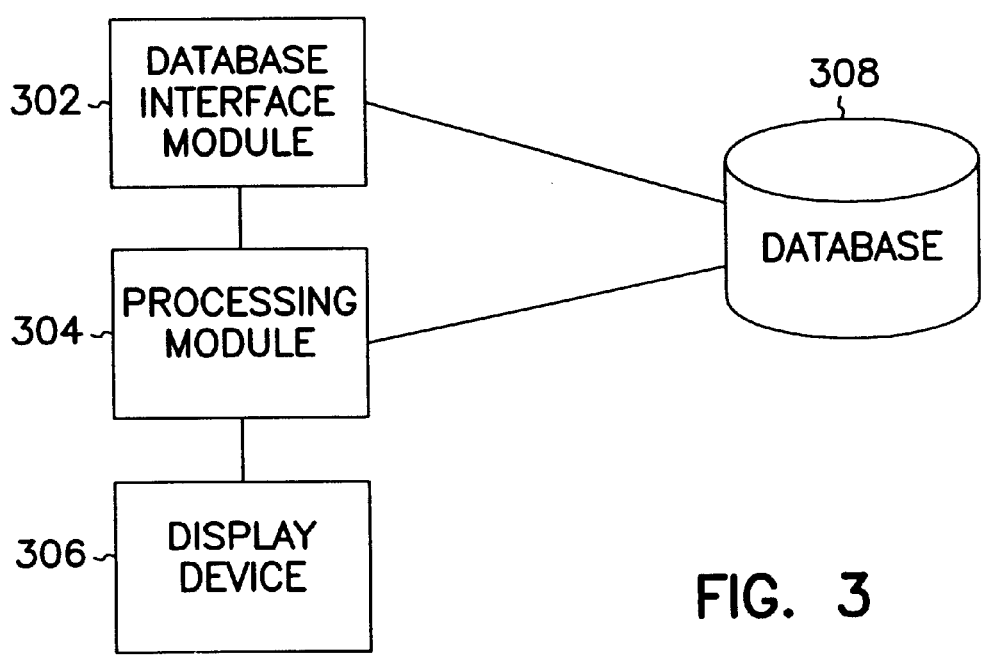
FIG. 3 is a block diagram illustrating the major components of another system embodiment of the present invention.

A computer user of the volume decomposition system of FIG. 3 wanting information related to a sales volume for a product typically invokes the system. However, the invention is not so limited, as the system may be invoked by batch and/or other automated processes, as is well known in the art. In one embodiment, the computer user invokes the volume decomposition system of FIG. 3 from an input screen shown in FIG. 4 and attached I/O devices such as a keyboard and pointing device which are also represented by display device block 306.

Figure 4:
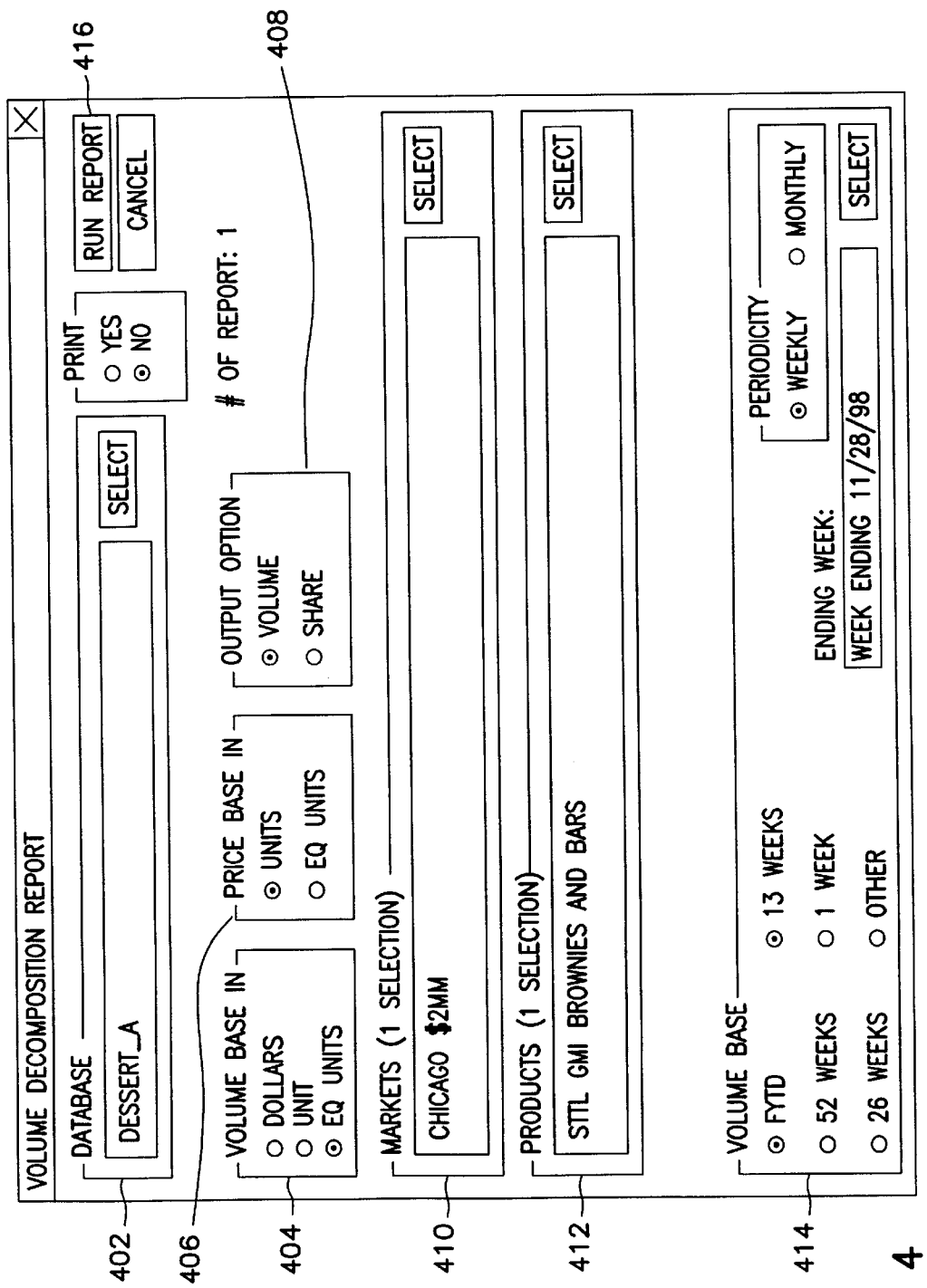
FIG. 4 is an embodiment of an input screen used in conjunction with embodiments of a volume decomposition system.

The input screen of FIG. 4 provides a template that allows the computer user to enter various parameters into the volume decomposition system. For example, option 402 of the screen of FIG. 4 enables the computer user to select from which database the volume information is to be taken, as different databases are associated with different products. In one embodiment, the databases are located within an externally sourced database such as one provided by the AC Nielsen database system. An AC Nielsen database system is a database system well known in product marketing that accumulates information and statistics related to the types and amounts of products being sold at points of distribution (e.g., stores) throughout the United States during different time periods. FIG. 4 also includes option 404 which allows the computer user to select which type of volume basis (e.g., dollars, units or eq units (i.e., equivalized units)) of the volume information that the database outputs. Option 406 of FIG. 4 allows the computer user to select the type of price basis (e.g., units or eq units) of the volume information that the database outputs. Moreover, option 408 of FIG. 4 allows the computer user to select whether the information that the database outputs is either in volume or shares.

FIG. 4 also includes option 410 that allows the computer user to select from which geographical market to obtain the volume information (e.g., a particular city, a particular region of the United States or the entire United States). Moreover, FIG. 4 includes option 412 that allows the computer user to select from which particular product to obtain the volume information (e.g., a cereal product). FIG. 4 also provides option 414 that allows the computer user to select from which time period to obtain the volume information.

Once the computer user has selected these parameters and selects button 416 from the input screen of FIG. 4, database interface module 302 receives these parameters and sends them as an input request to database 308. Database 308 processes this input request and outputs the requested sales volume information for a particular product to processing module 304. In one embodiment, this sales volume information includes the total volume for the selected product, market and time period for both time periods. For example, returning to the illustration wherein database 308 is a database that is part of the AC Nielsen database system, the product could be a brownie mix product sold across the United States for the entire year of 1999. Accordingly in one embodiment, the comparison period would be the entire year of 1998, and therefore, in one such embodiment, the sales volume for the entire year of 1998 and the entire year of 1999 for the brownie mix product would be provided by a database that is part of the AC Nielsen database system. In another embodiment, the database returns the change in the sales volume across the two time periods. For example in such an embodiment, the database would provide the change in the sales volume from 1998 to 1999.

In one embodiment, the total volume change includes the base volume change as well as the incremental volume change. In particular, base volume for a particular product is a calculated measure stating the normal expected sales in the absence of trade promotion (i.e., merchandising conditions), while incremental volume is defined as a calculated measure showing the sales achieved via trade promotion that was over and above the base volume.

In a further embodiment, database 308 provides additional information related to the changes in the incremental volume. In one embodiment, the additional information provided by database 308 includes how the incremental volume has changed based on different merchandising conditions. One example of a merchandising condition is a temporary price reduction (i.e., TPR) for a particular product, which is defined as any price reduction of at least 5%.

Moreover, three other types of merchandising conditions that have considerable influence on the incremental volume change include what are termed features and displays. In particular, a feature is an ad in a newspaper and/or a store flyer, while a display is the placement of the product in an additional location within the point of distribution (e.g., a store) apart from the product's primary stocking location(s). Additionally, a third type of merchandising condition includes both features and displays for the particular product. The size and location of features and displays are important factors in the change in the incremental volume. Accordingly in one embodiment, based on a temporary price reduction, a feature and a display, database 308 also outputs (2) the incremental volume change due to a temporary price reduction, (2) the incremental volume change due to features, absent any display, (3) the incremental volume change due to displays, absent any feature and (4) incremental volume change due to both features and displays for a particular product.

Returning to FIG. 3, processing module 304 that is operatively coupled to database interface module 302 and database 308 receives this sales volume information from database 308 and processes this information to form additional sales volume information, described below. In one embodiment, processing module 304 determines a change in the incremental volume caused by different merchandising conditions (e.g., TPRs, features and displays for a particular product) across the compared time periods. In one embodiment, processing module 304 manipulates and varies the variables of the following formula that defines the incremental volume for a particular product:

$$\text{Incremental Volume} = \text{Base Volume} * \text{"\% Base Support"} * \text{"\% Lift"} \quad (4)$$

wherein "% Base Support" is the percentage of the base volume that is exposed to a particular merchandising condition or factor during the particular time period. Moreover, "% Lift" is a percentage that the volume increased due to the base volume being exposed to the particular merchandising conditions or factors (e.g, a temporary price reduction (TPR), feature or display) during the time period. In other words, this defines how much impact was made on the volume due the base volume being exposed to the particular merchandising condition. Advantageously, this manipulation and variation of the above formula by processing module 304, described in detail below, enables a greater decomposition and breakdown of the sales volume for a particular product in order to prescribe viable and practical solutions for an increase in the sales volume for that product.

In one such embodiment, five different incremental volume-related measures are calculated for each of four different merchandising conditions based on equation #4. Advantageously, a two-dimensional array of twenty values is created to enable further volume decomposition and analysis related to the incremental sales volume for a particular product. In particular, the four different merchandising conditions for a particular product are (1) a temporary price reduction, (2) features, absent any displays, (3) a display, absent any features, and (4) features and displays, all of which were described in detail above.

Additionally, the five different incremental volume-related measures are based on five different formulas, which are variations of equation #4, and include (1) the change in the incremental volume due to a change in the absolute amount of base volume being exposed to a particular merchandising condition across comparable time periods for a particular product, (2) the change in the incremental volume due to a change in the percent of the base volume being exposed to a particular merchandising condition across comparable time periods for a particular product, (3) the change in the incremental volume due to a change in the percent lift in the incremental volume for a particular merchandising condition across comparable time periods for a particular product, (4) the change in the incremental volume due to a change in the depth of a discount for a particular merchandising condition across comparable time periods for a particular product and (5) the change in the incremental volume due to a change in the effectiveness in a given level of discount for a particular merchandising condition across comparable time periods for a particular product.

For each of the five formulas, the generic term "merchandising condition" is used. Accordingly, for each of these formulas, this generic term is substituted with each of the four different merchandising conditions to create a value related to each of the four different merchandising conditions. Moreover in one embodiment, the values used in conjunction with these five formulas to calculate these changes in the incremental volume are those values received from database 308, as previously described.

For the first incremental volume-related measure, returning to equation #4 above, the "Base Volume" is varied, while "% Base Support" and "% Lift" are held constant. In particular, the first incremental volume-related measure is the change in the incremental volume due to a change in the amount of the base volume being exposed to one of the four different merchandising conditions. This measure is based on the following formula:

$$\text{Change in Incremental due to Change in Base} = ((\text{Current Base Volume} - \text{Previous Base Volume}) * (\text{Previous \% Base Support}/100) * (\text{Previous \% Lift}/100)) \quad (5)$$

wherein the "Current Base Volume" and the "Previous Base Volume" are the total base volumes for the selected product in the current and previous periods, respectively. The "Previous % Base Support" is the percent of the base volume exposed to the particular merchandising condition during the previous period. Additionally, "Previous % Lift" is defined as the percent increase in the incremental volume due to the base volume exposure to the particular merchandising condition during the previous period.

For this first incremental volume-related measure, each of the four different merchandising conditions are substituted to form four different values with each one related to a different merchandising condition. For example, when a temporary price reduction is the merchandising condition, the change in the incremental volume due to the change in the base volume for a temporary price reduction is based on the following formula:

$$\text{Change in Incremental due to Change in Base based on a Temporary Price Reduction} = ((\text{Current Base Volume} - \text{Previous Base Volume}) * (\text{Previous \% Base Support for a "Temporary Price Reduction"}/100) * (\text{Previous \% Lift for a "Temporary Price Reduction"}/100)) \quad (5a)$$

To further illustrate, assume a user wants to perform volume decomposition for Wheat Chex® for all points of distribution in the entire United States during the time period of the month of May in the year 1998 (i.e., the current time period). Accordingly, the previous time period to which the current time period is compared is the month of May in the year 1997. The following table—Sales Volume Table—includes relevant sales volume information for this illustration:

| SALES VOLUME TABLE FOR WHEAT CHEX ® | |
| --- | --- |
| Base Volume for May 1997 (i.e., Previous Base Volume) | 100 units |
| Base Volume for May 1998 (i.e., Current Base Volume) | 150 units |
| % Base Support for May 1997 (i.e., Previous Base Support) | 50% |
| % Base Support for May 1998 (i.e., Current Base Support) | 60% |
| % Lift for May 1997 (i.e., Previous % Lift) | 100% |
| % Lift for May 1998 (i.e., Current % Lift) | 80% |

The "% Base Support" is the percent of the base volume that is exposed to a temporary priced reduction during the time period, and the "% Lift" is the percentage that the volume increased due to the base volume being exposed to a temporary price reduction during time period. Substituting the applicable values from the "Sales Volume Table for Wheat Chex®" into equation #5a, the incremental volume for Wheat Chex® for May, 1998 has, therefore, increased 25 units when compared to May, 1997 because the total base volume increased by 50 units:

Change in Incremental due to Change in Base based on a Temporary Price Reduction from May, 1997 to May, 1998=((150−100)*(50/100)*(100/100))=25 units (5b)

Accordingly, embodiments of the present invention use equation #5 to calculate the change in incremental volume due to a change in the base volume across two comparable time periods based on different merchandising conditions. In one embodiment, processing module 304 determines a change in the incremental volume due to a change in the base volume being exposed to a temporary price reduction for a particular product. In another embodiment, processing module 304 determines a change in the incremental volume due to a change in the base volume being exposed to features, absent any displays, for the particular product. In still another embodiment, processing module 304 determines a change in the incremental volume due to a change in the base volume being exposed to displays, absent any features for the particular product. In yet a further embodiment, processing module 304 determines a change in the incremental volume due to a change in the base volume being exposed to both features and displays for the particular product.

For the second incremental volume-related measure, returning to equation #4 above, the "% Base Support" is varied while the "Base Volume" and "% Lift" are held constant. In particular, the second incremental volume-related measure that is determined by processing module 304 is a change in the incremental volume due to a change in a percent of the base volume being exposed to a particular merchandising condition. Typically, this change in the incremental volume is influenced by the number and the size of the retailers that are promoting the product. This second measure is determined based on the following formula:

Change in Incremental due to Change in % Merchandising Base Support ((((Current % Base Support−Previous % Base Support)/100)*((Current % Lift+Previous % Lift)/2)/100*(Current Base Volume)) (6)

Returning to the illustration involving Wheat Chex® for May, 1998 in the entire United States and substituting the applicable values from the "Sales Volume Table for Wheat Chex®" into equation #6, the incremental volume for Wheat Chex® for May, 1998 has increased 9 units when compared to May, 1997 because the percent of the base volume that was exposed to a temporary price reduction was increased from 50% to 60% from May, 1997 to May, 1998:

Change in Incremental due to Change in % Merchandising Base Support based on a Temporary Price Reduction from May, 1997 to May, 1998=(((60−50)/100)*((80+100)/2)/100*(150))=13.5 units (6a)

Accordingly, embodiments of the present invention use equation #6 to calculate the change in incremental volume due to a change in the percent of the base volume being exposed to a particular merchandising condition across two comparable time periods. In one embodiment, processing module 304 determines a change in the incremental volume due to a change in a percent of the base volume being exposed to a temporary price reduction for a particular product. In another embodiment, processing module 304 determines a change in the incremental volume due to a change in a percent of the base volume being exposed to features, absent any displays, for a particular product. In still another embodiment, processing module 304 determines a change in the incremental volume due to a change in a percent of the base volume being exposed to displays, absent any features, for the particular product. In yet a further embodiment, processing module 304 determines a change in the incremental volume due to a change in a percent of the base volume being exposed to both features and displays for the particular product.

For the third incremental volume-related measure, returning to equation #4 above, the "% Lift" is varied while the "Base Volume" and "% Base Support" are held constant. In particular, the third incremental volume-related measure that is determined by processing module 304 is a change in the incremental volume due to a change in the percent of lift of the incremental volume due to the base volume being exposed to a particular merchandising condition. This third measure is based on the following formula:

Change in Incremental due to Change in % Lift=(((Current % Lift−Previous % Lift)/100)*((Current % Base Support+Previous % Base Support)/2)/100*(Current Base Volume)) (7)

Returning to the illustration involving Wheat Chex® for May, 1998 in the entire United States and substituting the applicable values from the "Sales Volume Table for Wheat Chex®" into equation #7, the incremental volume for Wheat Chex® for May, 1998 has decreased 16.5 units when compared to May, 1997 because the percent of increase to the incremental volume due to the base volume being exposed to the temporary price reduction was decreased from 100% to 80% from May, 1997 to May, 1998:

Change in Incremental due to Change in % Lift based on a Temporary Price Reduction from May, 1997 to May, 1998=(80−100)/100*(((60+50)/2))/100)*150=−16.5 units (7a)

Accordingly, embodiments of the present invention use equation #7 to calculate the change in incremental volume due to a change in the percent lift of the incremental volume due to the base volume being exposed to a particular merchandising condition across two comparable time periods. In one embodiment, processing module 304 determines a change in the incremental volume due to a change in the percent increase of the lift in the incremental volume caused by the base volume being exposed to a temporary price reduction for a particular product. In another embodiment, processing module 304 determines a change in the incremental volume due to a change in the percent increase of the lift in the incremental volume caused by the base volume being exposed to features, absent any displays, for the particular product. In still another embodiment, processing module 304 determines a change in the incremental volume due to a change in the percent increase of the lift in the incremental volume caused by the base volume being exposed to displays, absent any features, for the particular product. In yet a further embodiment, processing module 304 determines a change in the incremental volume due to a change in the percent increase of the lift in the incremental volume caused by the base volume being exposed to both features and displays for the particular product.

In additional embodiments, the change in the incremental volume due to a change in the percent lift for a particular product across the two comparison periods is further decomposed. In one such embodiment, the change in the incremental volume is decomposed into (1) the change in incremental volume due to a change in the depth of price discount of a particular merchandising condition and (2) a change in the incremental volume due to a change in the effectiveness of a given level of price discount of a particular merchandising condition. In one such embodiment, an assumption is made that the lift is a linear function of discount. For example, if a 10% discount gives a 100% lift, a 20% discount gives a 200% lift. This assumption is generally confirmed by research studies and typically holds true except at extreme values of discount. Accordingly, the fourth incremental volume-related measure is a change in the incremental volume due to a change in a depth of discount for a particular merchandising condition, based on the following formula:

Change in Incremental due to a Change in Depth of Discount=((Current % Price Discount−Previous % Price Discount)*(((Current % Incremental Lift/Current % Price Discount)+(Previous Incremental Lift/Previous % Price Discount))/2)/100*((Current % Base Support+Previous % Base Support)/2)/100*(Current Base Volume)) (8)

wherein "Current % Price Discount" and the "Previous % Price Discount" are the percent discount prices of the particular merchandising condition for the particular product during the current and previous periods, respectively.

Returning to the illustration involving Wheat Chex® for May, 1998 in the entire United States and substituting the applicable values from the "Sales Volume Table for Wheat Chex®" into equation #8, the incremental volume for Wheat Chex® for May, 1998 has increase 22 units when compared to May, 1997 because the percent of discount of the temporary priced reduction was increased from 15% to 20%:

Change in Incremental due to a change in Depth of Discount from May, 1997 to May, 1998=((20−15)*(((80/20)+(100/15))/2)/100*((60+50)/2)/100*(150))=(5)*(0.053)*(0.55)*150=22 units (8a)

Accordingly, embodiments of the present invention use equation #8 to calculate the change in incremental volume for a particular product due to the change in the depth of the discount for a particular merchandising condition across two comparable time periods. In one embodiment, processing module 304 determines the amount of incremental volume change due a change in a depth of discount of a temporary price reduction for a particular product. In another embodiment, processing module 304 determines the amount of incremental volume change due to a change in a depth of discount of a feature, absent any displays, for a particular product. In still another embodiment, processing module 304 determines the amount of incremental volume change due to a change in a depth of discount of a display, absent any features, for a particular product. In yet a further embodiment, processing module 304 determines the amount of incremental volume change due to a change in a depth of discount of features and displays for a particular product.

In one embodiment, the fifth incremental volume-related measure is the change in the incremental volume due to a change in an effectiveness of the depth of discount for a particular merchandising condition. This incremental volume-related measure is quantifying other factors beyond the change in the percent of discount price that affect the percent of lift. In particular, this measure determines the change in lift per point of discount across the two periods being compared. One factor that could be affecting this measure is the location of the feature. For example, in the previous period, the feature could be on the front page of an advertisement, while in the current period, the feature is moved to one of the middle pages of an advertisement. Accordingly, even though the size of the discount price has not varied, the percent of lift may drop because the "effectiveness" of the discount is less due to its location. This measure is based on the following formula:

Change in Incremental due to a Change in Effectiveness=(((Current % Incremental Lift)/Current % Discount Price)−(Previous % Incremental Lift/Previous % Discount Price))/100*(Current % Discount Price+Previous % Discount Price)/2*((Current % Base Support+Previous % Base Support)/2)/100*(Current Base Volume)) (8)

Returning to the illustration involving Wheat Chex® for May, 1998 in the entire United States and substituting the applicable values from the "Sales Volume Table for Wheat Chex®" into equation #9, the incremental volume for Wheat Chex® for May, 1998 has decreased −38.5 units when compared to May, 1997 because the change in lift per point of discount (i.e., the effectiveness of the discount) increased from 4 to 6.67:

Change in Incremental due to a Change in Effectiveness from May, 1997 to May, 1998=(((80/20)−100/15)/100*(20+15)/2*(60+50)/2/100*(150))=(4−6.67)/100*17.5*0.55*150=38.5 units (9a)

Accordingly, embodiments of the present invention use equation #9 to calculate the change in incremental volume for a particular product due to the change in the effectiveness of the discount of a particular merchandising condition to which the base volume has been exposed across two comparable time periods. In one embodiment, processing module 304 determines the amount of incremental volume change caused by a change in an effectiveness of a temporary price reduction for a particular product. In another embodiment, processing module 304 determines the amount of incremental volume change caused by a change in an effectiveness of a feature, absent any displays, for a particular product. In still another embodiment, processing module 304 determines the amount of incremental volume change caused by a change in an effectiveness of a display, absent any features for a particular product. In yet a further embodiment, processing module 304 determines the amount of incremental volume change caused by a change in an effectiveness of both features and displays for a particular product.

Advantageously, embodiments of this volume decomposition system set forth greater detail on why the incremental volume changed. In particular, this system provides a greater decomposition of the sale volume by disclosing changes in the incremental volume due to (1) a change in the absolute amount of base volume being exposed to a particular merchandising condition, (2) a change in the percent of the base volume being exposed to a particular merchandising condition, and (3) a change in the percent of lift in the incremental volume due to the base volume being exposed to a particular merchandising condition. Further, the change in the incremental volume due to a change in the percent of lift is broken down to determine how the change in the percent of price discount of a merchandising condition as well how a change in the effectiveness of that discount of a merchandising condition effect the change in the incremental volume. Advantageously, this system allows individuals to prescribe more viable and precise solutions to increase the sales volume for particular products in particular geographical markets.

Moreover, processing module 304 determines changes in the base volume as well as other changes in the incremental volume for a particular product; calculations of which are known in the art. In one embodiment, processing module 304 determines the change in the base volume and/or the incremental volume due to the introduction of a new item, which is defined as an item having sales in the current period but not having sales in the comparison period for the particular market being analyzed. In another embodiment, processing module 304 determines changes in the base volume and/or the incremental volume due to an item being discontinued, which is defined as an item having sales in the comparison period but not in the current period. Additionally, in one embodiment, processing module 304 determines changes in the base volume and/or the incremental volume due to an item having sales in both the current and comparison periods.

In one embodiment, processing module 304 determines a change in the base volume due to a change in the amount of distribution (e.g., stores), which is defined as the amount of ACV from which the particular product is being sold. In another embodiment, processing module 304 determines a change in the base volume due to a change in turns, which are defined as the number of units of a particular product is being sold for a particular distribution point. In another embodiment, processing module 304 determines a change in the incremental volume not attributable to merchandising conditions.

In additional embodiments, processing module 304 provides a number of lists of causal factors related to the sales volume information received from database 308 as well as the additional sales volume information determined by processing module 304, described above. These lists of causal factors attempt to provide viable solutions to improved sales volume for the particular product being analyzed. Some examples of causal factors include price and competitive activity, changes in the ACV as well as in-store activity and holidays.

Figure 5A:
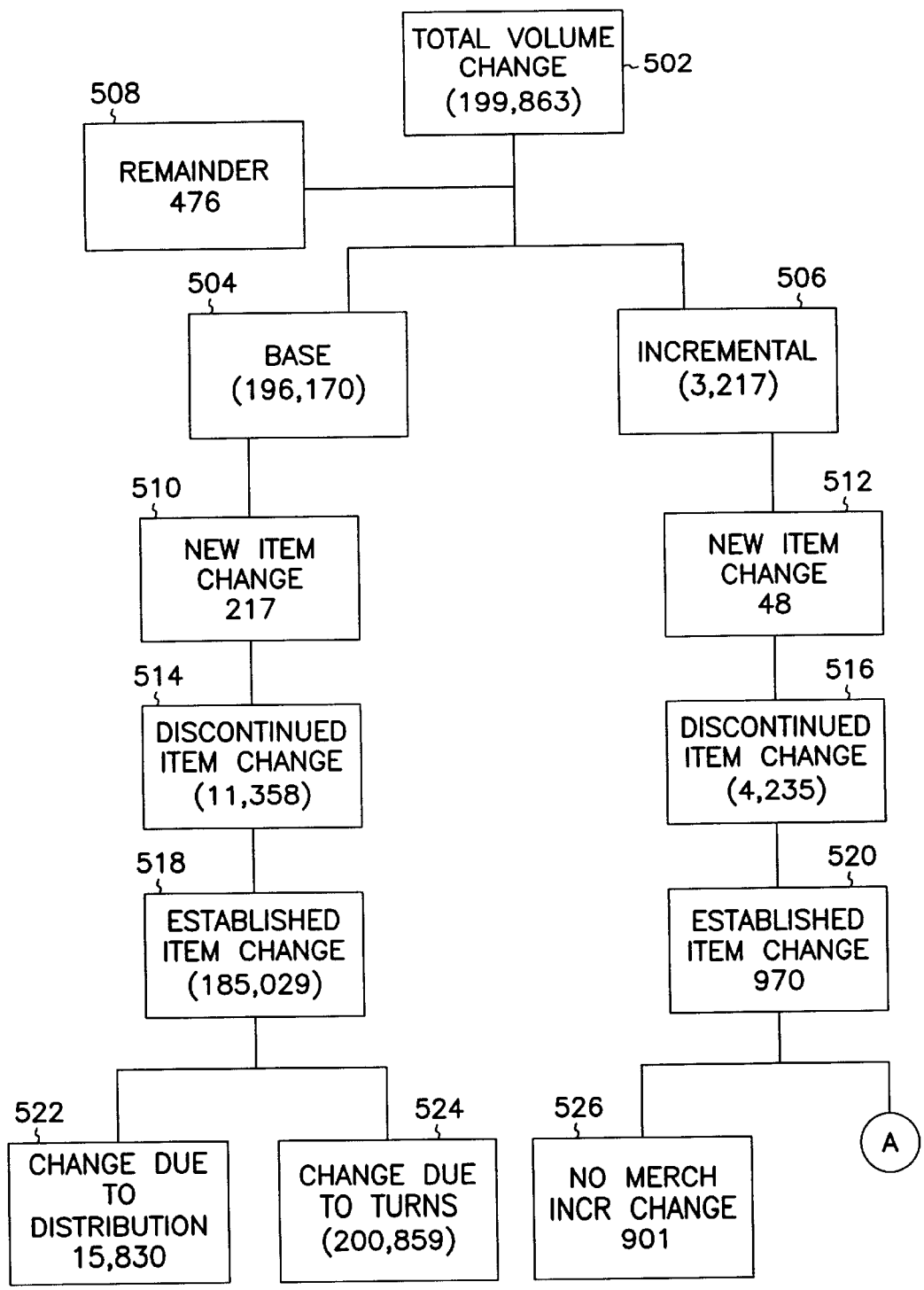
FIG. 5A is an embodiment of a display of the output for volume decomposition for a particular product.
Figure 5B:
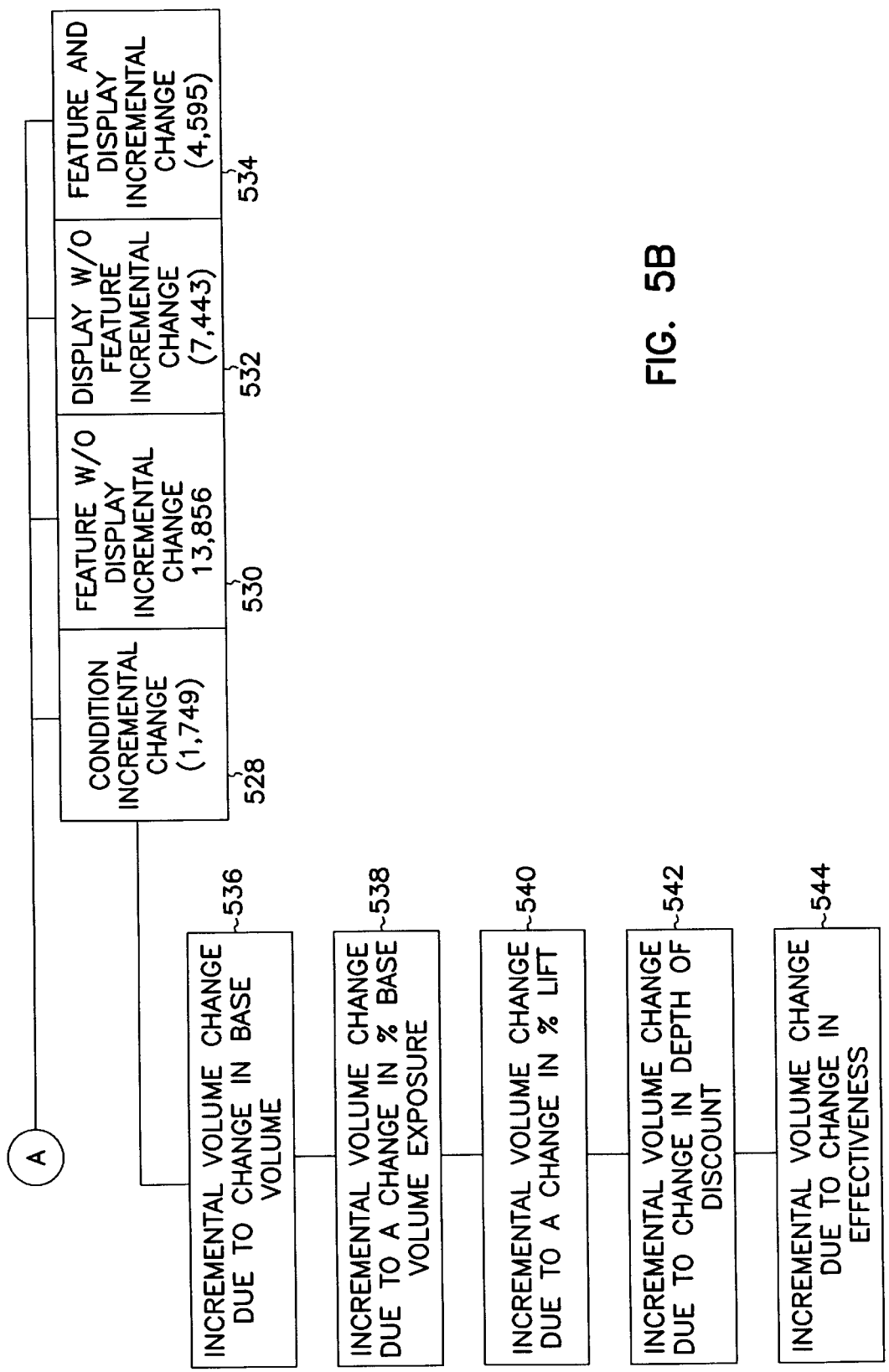
FIG. 5B is another embodiment of a display of the output for volume decomposition for a particular product.

Display device 306 that is operatively coupled to processing module 304 receives this sales volume information including the information determined by processing module 304 and displays this information. One embodiment of the display by display device 306 is illustrated in FIGS. 5A–5B. In one such embodiment, FIGS. 5A and 5B are concatenated at point "A" of both Figures to form one display screen. FIGS. 5A–5B illustrate the output for volume decomposition for a particular product. In particular, FIGS. 5A–5B include volume information-type blocks 502–544 that include associated change in volume numbers in the related block. Moreover, for each of these volume numbers, if the number is in parenthesis, it means that the volume change is lower than the period to which it is being compared. For example, the associated volume change number for "total volume change" block 502 equals 199,863. Because this value is in parenthesis, this means that the total volume change is down by this value when compared to the comparison period. In one such embodiment, display device 306 displays volume information-type blocks 502–544 in a spreadsheet application.

FIG. 5A includes "total volume change" block 502, which is the total volume change, including both base volume and incremental volume change, for a particular product. FIG. 5A also illustrates "total volume change" block 502 being broken down further into a change in the base volume (i.e., "base" block 504) and the incremental volume (i.e., "incremental" block 506). FIG. 5A also includes "remainder" block 508 which is a value resulting from rounding within each of the numerous calculations. In general, the remainder should be less than 1% of the total volume change but can be larger if the product total includes many SKUs (Stock Keeping Units) with ACV (All Commodity Volume) less than one, but still having sales.

FIG. 5A also includes "new item change" block 510 for the base volume as well as "new item change" block 512 for the incremental volume. Both "new item change" block 510 for the base volume and "new item change" block 512 for the incremental volume are defined as those items having sales in the current period but not having sales in the comparison period for the particular market being analyzed. FIG. 5A also includes "discontinued item change" block 514 for the base volume and "discontinued item change" block 516 for the incremental volume. Both "discontinued item change" block 514 for the base volume and "discontinued item change" block 516 for the incremental volume are defined as those items having sales in the comparison period but not in the current period. Additionally, FIG. 5A includes "established item change" block 518 for the base volume and "established item change" block 520 for the incremental volume. Both "established item change" block 518 for the base volume and "established item change" block 520 for the incremental volume are defined as those items having sales in both the current and the comparison periods.

Figure 6A:
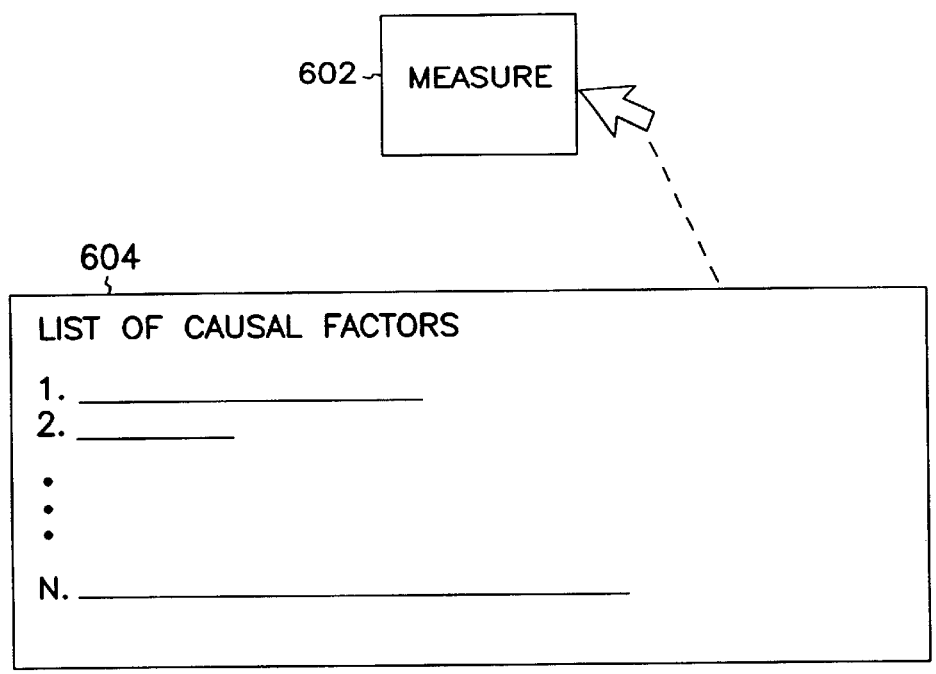
FIG. 6A is another embodiment of a display of the output for volume decomposition for a particular product.
Figure 6B:
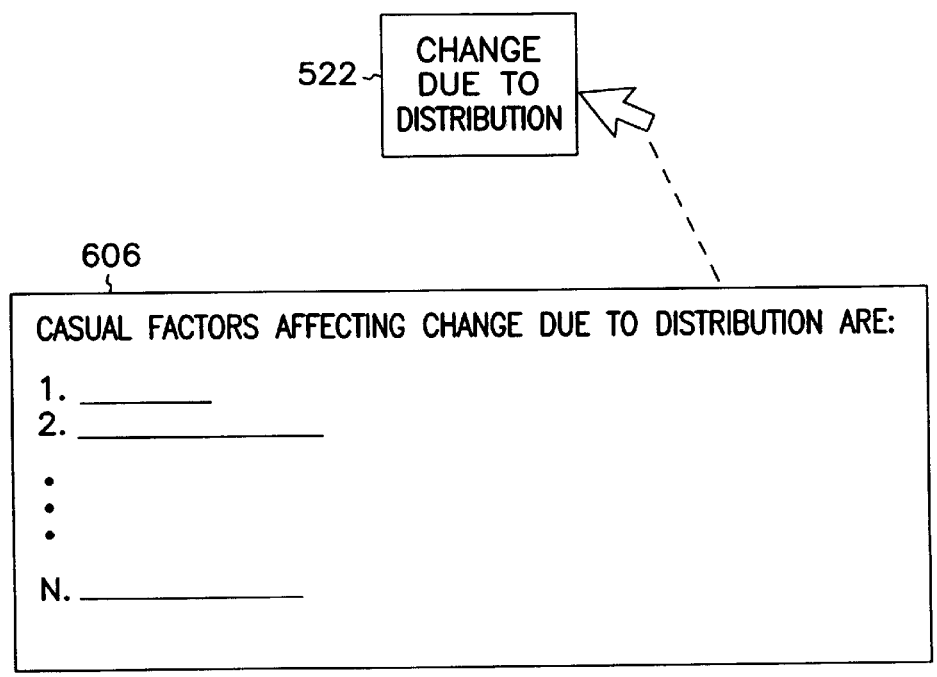
FIG. 6B is another embodiment of a display of the output for volume decomposition for a particular product.

FIG. 5A also includes "change due to distribution" block 522 for the base volume. "Change due to distribution" block 522 is defined as that change in the base volume due to a change in the amount of distribution (e.g, stores), which is defined as the amount of ACV from which the particular product is being sold. As illustrated in FIGS. 5A–5B, in one embodiment, display device 306 also shows a list of possible causal factors associated with the different blocks of FIGS. 5A–5B (i.e., blocks 502–544) based on the volume change number for the blocks. FIG. 6A illustrates the display of a list of possible causal factors associated with a particular block. In one such embodiment, this list is displayed when the associated block is highlighted (e.g., a mouse pointer is placed on the block area). In particular, FIG. 6A includes block 602, which is representative of any of the blocks of FIGS. 5A–5B, and list of causal factors 604, which includes a list of possible causal factors affecting the volume change for that particular block. By way of example, FIG. 6B illustrates the display of a list of possible causal factors (i.e., list 606) associated with "change due to distribution" block 522. An example of a causal factor that may cause this change due to distribution is the changes in ACV.

Additionally, display device 306 displays "change due to turns" block 524 for the base volume. "Change due to turns" block 524 is defined as the change in the base volume due to turns, wherein turns are defined as the number of units of a particular product is being sold for a particular distribution point. Similar to "change due to distribution" block 522 and shown in FIGS. 6A–6B, in one embodiment, display device 306 also shows a list of possible causal factors causing this change due to turns when "change due to turns" block 524 is highlighted. For example, one factor that may cause this change due to turns could include price and competitive activity.

In one embodiment shown in FIG. 5A, display device 306 also displays "no merchandising incremental change" block 526. This block includes the change in the incremental volume that is not attributed to merchandising conditions. In one embodiment illustrated in FIGS. 6A–6B, display device 306 also shows a list of possible causal factors causing this change in incremental volume not attributed to a merchandising condition when "no merchandising incremental change" block 526 is highlighted. For example, one factor that may cause this change could include in-store activity and holiday effects.

In another embodiment illustrated in FIG. 5B, display device 306 displays "condition incremental change" block 528. This block includes the amount of incremental volume change due to a particular merchandising condition. In one such embodiment, the merchandising condition is a TPR. In an alternative embodiment illustrated in FIG. 5, display device 306 displays "feature w/o display incremental change" block 530. As previously described above in conjunction with the "feature and display" merchandising conditions, this block includes the incremental volume change due to a feature, absent any displays for the particular product.

In a further embodiment illustrated in FIG. 5B, display device 306 displays "display w/o feature incremental change" block 532. As previously described above in conjunction with the "feature and display" merchandising conditions, this block includes the incremental volume change due to a display, absent any features for the particular product. In yet a further embodiment illustrated in FIG. 5B, display device 306 displays feature and display incremental change" block 534. As previously described above in conjunction with the "feature and display" merchandising conditions, this block includes the incremental volume change due to features and displays for the particular product.

In additional embodiments illustrated in FIG. 5, display device 306 displays the volume information determined by processing module 304, as described above. In one embodiment, display device 306 displays "incremental volume change due to change in base volume" block 536. As previously described above in conjunction with processing module 304, this block defines the incremental volume change due to a different amount of the base volume being exposed to a particular merchandising condition. This block has four associated volume change numbers with each one of the four numbers also related to blocks 528–534, respectively, illustrated in table 700 of FIG. 7. In one such embodiment, table 700 is combined with FIGS. 5A–5B in one display screen viewed by the computer user of embodiments of the decomposition system.

In particular, table 700 takes blocks 528–544 and associates volume change numbers corresponding to two of the blocks. For example, the incremental volume change is down 3,117 units (the number associated with block 536 and block 528) due to a different amount of the base volume being exposed to a particular condition (e.g., TPR). In another example, the incremental volume change is down 6,039 units (the number associated with block 536 and block 530) due to a different amount of the base volume being exposed to a feature, absent any displays for the particular product being analyzed. In one embodiment illustrated in FIGS. 6A–6B, display device 306 also displays a list of possible causal factors causing this change in incremental volume due to a different amount of the base volume being exposed to a merchandising condition or factor when block 536 is highlighted.

In another embodiment, display device 306 displays "incremental volume change due to change in % merchandising base support" block 538. As previously described above in conjunction with processing module 304, this block defines the incremental volume change due to a change in percentage of the base volume that has been exposed to a particular merchandising condition. Similar to block 536, this block has four associated volume change numbers with each one of the four numbers also related to blocks 528–534, respectively, as illustrated in table 700 of FIG. 7. For example, the incremental volume change is down 6,866 units (the number associated with block 538 and block 532) due to a change in the percentage of the base volume being exposed to displays, while not being exposed to any features for the particular product being analyzed. In another example, the incremental volume change is down 2,282 units (the number associated with block 538 and block 534) due to a change in the percentage of the base volume being exposed to features and displays for the particular production being analyzed. In one embodiment illustrated in FIGS. 6A–6B, display device 306 also displays a list of possible causal factors causing this change in incremental volume due to a change in percentage of merchandise base support is defined as the incremental volume change due to a change in the percent of the base volume being exposed to a particular merchandising condition when block 538 is highlighted.

In a further embodiment, display device 306 displays "incremental volume change due a change in % lift" block 540. As previously described above in conjunction with processing module 304, this block defines how much the incremental volume is lifted due to the base volume exposure to a particular merchandising condition. Similar to block 536, this block has four associated volume change numbers with each one of the four numbers also related to blocks 528–534, respectively, as illustrated in table 700 of FIG. 7. For example, the incremental volume change is up 5,531 units (the number associated with block 540 and block 528) because the lift in the incremental volume due to the base volume exposure to a temporary price reduction. In another example, the incremental volume change is up 4,791 units (the number associated with block 540 and block 530) because the lift in the incremental volume due to the base volume exposure to a feature and not a display for the particular product being analyzed. In one embodiment illustrated in FIG. 6A–6B, display device 306 also displays a list of possible causal factors causing this change in incremental volume due to a percentage of lift in the amount of incremental volume caused by the base volume being exposed to a particular merchandising condition when block 540 is highlighted.

In a further embodiment, display device 306 displays "incremental volume change due to a change in a depth of discount" block 542. As previously described above in conjunction with processing module 304, this block defines the amount of incremental volume change due to a depth of discount for the particular merchandising condition. Similar to block 536, this block has four associated volume change numbers with each one of the four numbers also related to blocks 528–534, respectively, as illustrated in table 700 of FIG. 7. For example, the incremental volume change is up 19,584 units (the number associated with block 542 and block 532) due to a depth of discount for the displays for the particular product being analyzed, absent features for the particular product. Additionally, the incremental volume change is up 10,005 units (the number associated with block 542 and block 534) due to a depth of discount for the features and displays for the particular product being analyzed. In one embodiment illustrated in FIGS. 5A–5B, display device 306 also displays a list of possible causal factors causing this change in the amount of incremental volume caused by a depth of discount for the particular merchandising condition or factor when block 542 is highlighted.

In a further embodiment, display device 306 displays "incremental volume change due to a change in effectiveness" block 544. As previously described above in conjunction with processing module 304, this block defines the amount of incremental volume change caused by an effectiveness of a depth of discount of the particular merchandising condition. Similar to block 536, this block has four associated volume change numbers with each one of the four numbers also related to blocks 528–534, respectively, as illustrated in table 700 of FIG. 7. For example, the incremental volume change is up 258 units (the number associated with block 544 and block 528) due to a change in an effectiveness of a depth of discount for a temporary price reduction. In another example, the incremental volume change is down 11,167 units (the number associated with block 544 and block 530) due to a change in an effectiveness of a discount of the features for the particular product being analyzed, absent any displays. In one embodiment illustrated in FIGS. 6A–6B, display device 306 also displays a list of possible causal factors causing this change in the amount of incremental volume caused by an effectiveness of the particular merchandising condition or factor when block 544 is highlighted.

Figure 8:
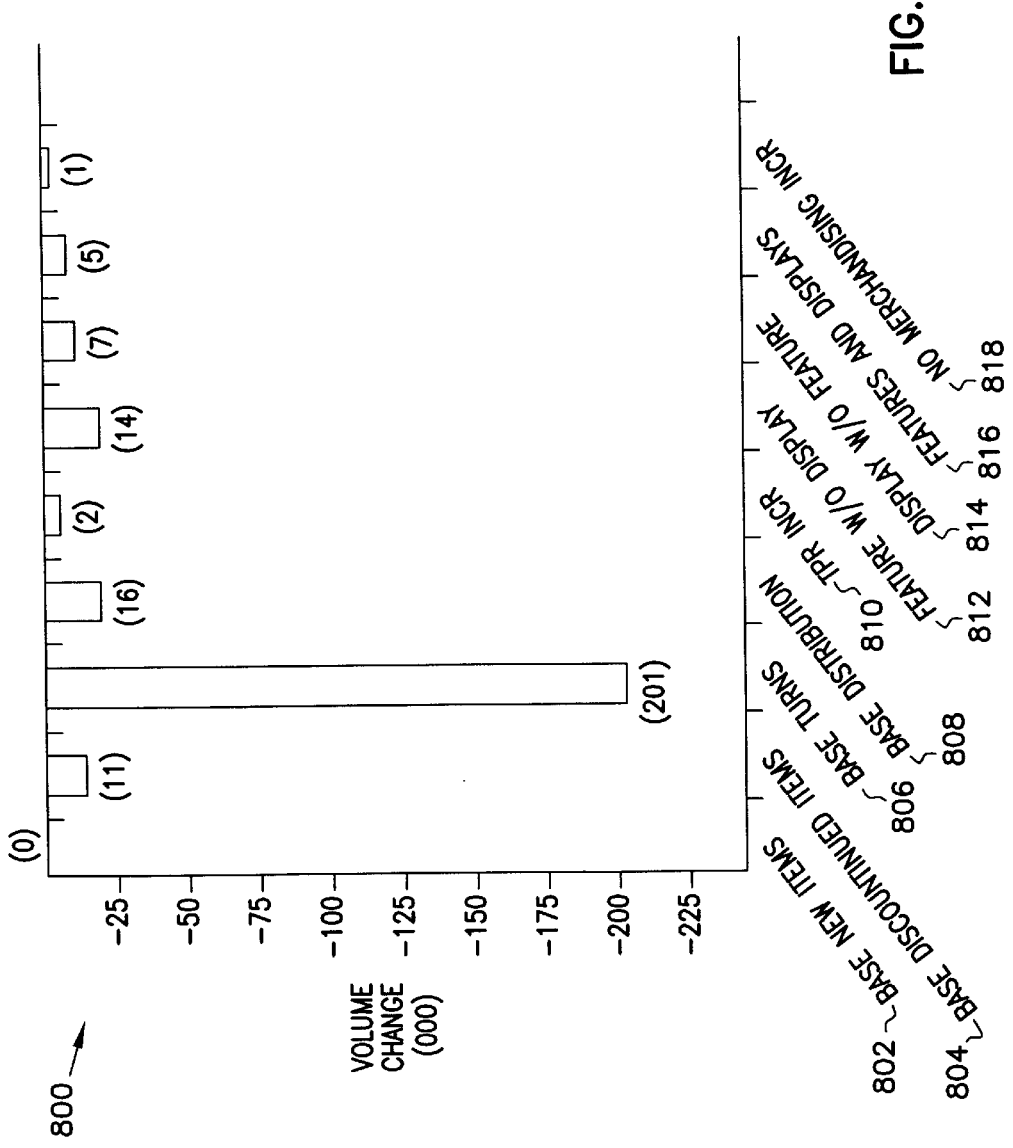
FIG. 8 is one embodiment of a graphical representation of changes in volume due to various conditions.

In another embodiment, display device 306 displays the changes in volume due to the various conditions illustrated in FIGS. 5A–5B (e.g., changes due to distribution) in a graphical representation. One such embodiment is illustrated as bar graph 800 in FIG. 8 wherein the changes in volume are displayed in a bar graph format. In particular, the change in volume due to "base new items" condition 802, which is the condition associated with block 510 of FIG. 5A, is approximately zero units, while the volume due to "base discontinued items" condition 804, which is the condition associated with block 514, is down approximately 11,000 units. Additionally, the volume due to "base turns" condition 806, which is the condition associated with block 524 of FIG. 5A, is down approximately 201,000 units, while the volume due to "base distribution" condition 808, which is the condition associated with block 522 of FIG. 5A, is down approximately 16,000 units.

The volume due to "TPR incr" condition 810, which is the condition associated with block 528 of FIG. 5B, is down approximately 2,000 units, and the volume due to "feature w/o display" condition 812, which is the condition associated with block 530, is down approximately 14,000 units. Moreover, the volume due to "display w/o feature" condition 814, which is the condition associated with block 532 of FIG. 5B, is down approximately 7,000 units, while the volume due to "features and displays" condition 816, which is the condition associated with block 534 of FIG. 5B, is down approximately 5,000 units. The volume change due to "no merchandising incr" condition 818, which is the condition associated with block 526 of FIG. 5A, is down approximately 1,000 units. In one embodiment, display device 306 forms one display that includes FIGS. 5A–5B, 7 and 8. In one such embodiment, display device 306 forms this one display in a spreadsheet application. FIG. 7 is one embodiment of a graphical representation of the changes in volume due to the various conditions illustrated in FIGS. 5A–5B. However, the invention is not so limited, as these changes in volumes can be embodied in other graphical representations (e.g., a pie chart or line graph).

Previously, system embodiments were described. In this section, method embodiments are described by references to a flowchart, shown in FIG. 9. The methods are realized at least in part as one or more programs running on a computer—that is, as a program executed from a computer-readable medium such as a memory by a processor of a computer. The programs are desirably storable on a computer-readable medium such as a floppy disk, a Compact Disk-Read Only Memory (CD-ROM), for distribution and installation and execution on another (suitably equipped) computer. Additionally, each of the blocks or combinations of blocks in FIG. 9 describe functionality that may be implemented in one or more software modules which can easily be written by one skilled in the art with reference to the flowchart.

Figure 9:
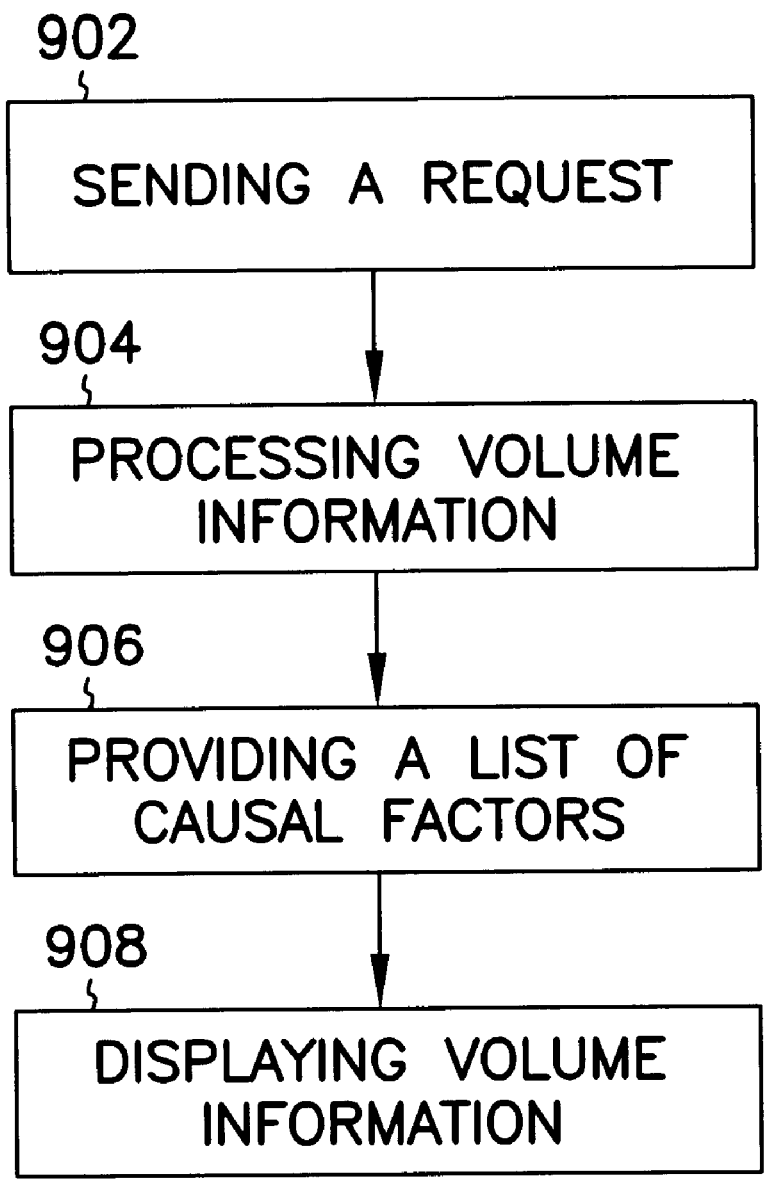
FIG. 9 is a flowchart of a method for volume decomposition according to one embodiment of the present invention.

In FIG. 9 in block 902, a request for sales volume information for a particular product is sent to a database. As previously described, either through a computer user filling out an input screen (one embodiment illustrated in FIG. 4) or through an automated process, input parameters, such as the particular database, product, geographical market and time frame, are sent as an input request to a database to obtain volume information for a particular product. The database then processes this input request and outputs the requested sales volume information. In one embodiment, this sales volume information includes the total volume for the selected product and market across two time periods. Moreover in a further embodiment, the total volume includes the base and incremental volume, as previously defined and described above in conjunction with the system embodiments. In another embodiment, the incremental volume provided by the database includes the incremental volume due to different merchandising conditions (e.g., TPR, feature or display).

In block 904, this sale volume information is received from the database and processed. Different method embodiments for determining (i.e., processing) the volume information have been described above in conjunction with processing module 304 of the system of FIG. 3. In block 906, a list of casual factors affecting the sales volume for the product is provided, as described above in conjunction with the system embodiments. In block 908, the sales volume information, which may include the information determined by processing module 304, as well as the lists of causal factors, is displayed, as described above in conjunction with display device 306 of the system of FIG. 3.

Figure 10:
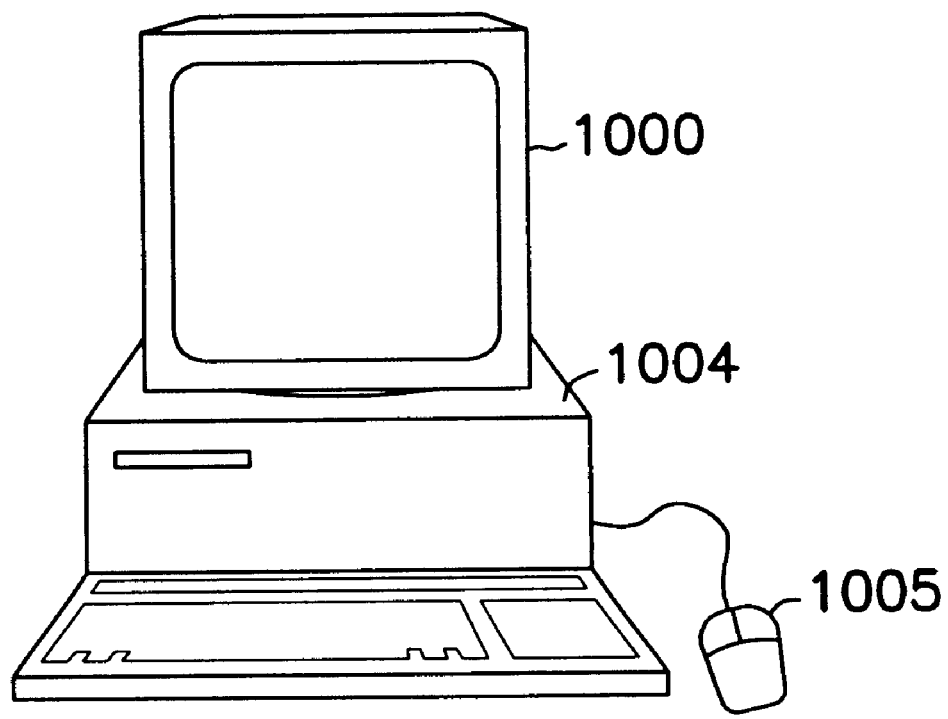
FIG. 10 is a block perspective diagram of a computer system embodiment of the present invention.

In other embodiments, method and system embodiments of the present invention comprise computer programs written for the decomposition of product information, as shown in FIG. 10. Computer 1004 is operatively coupled to display device 1000 and pointing device 1005. Computer 1004 includes a central processing unit, random-access memory (RAM), read-only memory (ROM), and one or more storage devices, such as a hard disk drive, a floppy disk drive (into which a floppy disk can be inserted), an optical disk drive, and a tape cartridge drive. The computer programs run on the central processing unit of computer 1004 out of main memory, and may be transferred to main memory from permanent storage via a disk drive when stored on removable media or via a network connection or modem connection when stored outside of the personal computer, or via other types of computer or machine readable medium from which it can be read and utilized. The computer programs comprise multiple modules or objects to perform the method embodiments of the present invention, or the functions of the modules in the apparatus embodiments of the present invention. The type of computer programming languages used to write the code may vary between procedural code type languages to object oriented languages, the files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

We claim:

1. A computer-implemented method of decomposing a sales volume for a product, the method comprising:

sending a request to a database for an amount of change from a first time period to a second time period in a sales volume condition of the product based on a merchandising condition of the product;

determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition;

generating a list of causal factors affecting the change in the incremental volume of the product due to the amount of change in the sales volume condition; and displaying the change in the incremental volume of the product due to the amount of change in the sales volume condition of the product and the list of causal factors affecting the change in the incremental volume of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in a depth of discount of the merchandising condition.

2. A computer-implemented method of decomposing a sales volume for a product, the method comprising:

sending a request to a database for an amount of change from a first time period to a second time period in a sales volume condition of the product based on a merchandising condition of the product;

determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition;

generating a list of causal factors affecting the change in the incremental volume of the product due to the amount of change in the sales volume condition; and displaying the change in the incremental volume of the product due to the amount of change in the sales volume condition of the product and the list of causal factors affecting the change in the incremental volume of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in the lift of the incremental sales volume per point of a discount of the merchandising condition.

3. A computer readable medium having instructions stored thereon for causing a computer to perform a method of decomposing a sales volume for a product, the method comprising:

sending a request to a database for an amount of change from a first time period to a second time period in a sales volume condition of the product based on a merchandising condition of the product;

determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition;

generating a list of causal factors affecting the change in the incremental volume of the product due to the amount of change in the sales volume condition; and displaying the change in the incremental volume of the product due to the amount of change in the sales volume condition of the product and the list of causal factors affecting the change in the incremental volume of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in a depth of discount of the merchandising condition.

4. A computer readable medium having instructions stored thereon for causing a computer to perform a method of decomposing a sales volume for a product, the method comprising:

sending a request to a database for an amount of change from a first time period to a second time period in a sales volume condition of the product based on a merchandising condition of the product;

determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition;

generating a list of causal factors affecting the change in the incremental volume of the product due to the amount of change in the sales volume condition; and displaying the change in the incremental volume of the product due to the amount of change in the sales volume condition of the product and the list of causal factors affecting the change in the incremental volume of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in the lift of the incremental sales volume per point of a discount of the merchandising condition.

5. A sales volume decomposition system for a product, comprising:

a processing module receiving a change from a first time period to a second time period in a sales volume condition of the product based on a merchandising condition of the product and determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition; and a display device operatively coupled to the processing module, wherein the display device receives and displays the change in the incremental sales volume of the product based on the change in the sales volume condition of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in a depth of discount of the merchandising condition.

6. A sales volume decomposition system for a product, comprising:

a processing module receiving a change from a first time period to a second time period in a sales volume condition of the product based on a merchandising condition of the product and determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition; and a display device operatively coupled to the processing module, wherein the display device receives and displays the change in the incremental sales volume of the product based on the change in the sales volume condition of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in the lift of the incremental sales volume per point of a discount of the merchandising condition.

7. A system for decomposing a sales volume for a product comprising:

a processor, a storage device coupled to the processor, and software means located on the storage device and operative on the processor for:

receiving incremental sales volume information, which measures a portion of a total sales volume of the product that was achieved because the product was subject to a merchandising condition;

determining, based on the incremental sales volume information, a change from a first time period to a second time period in an incremental sales volume of the product, wherein the change is calculated by varying a sales volume condition of the product between the first time period and the second time period; and displaying the change in the incremental sales volume of the product based on the change in the sales volume condition of the product, wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and wherein the change from the first time period to the second time period in the percentage of lift of the incremental sales volume includes a change from the first time period to the second time period in the incremental sales volume due to a change in a depth of discount of the merchandising condition.

8. A system for decomposing a sales volume for a product comprising:
    a processor;
    a storage device coupled to the processor; and
    software means located on the storage device and operative on the processor for:
        receiving incremental sales volume information, which measures a portion of a total sales volume of the product that was achieved because the product was subject to a merchandising condition;
        determining, based on the incremental sales volume information, a change from a first time period to a second time period in an incremental sales volume of the product, wherein the change is calculated by varying a sales volume condition of the product between the first time period and the second time period; and
        displaying the change in the incremental sales volume of the product based on the change in the sales volume condition of the product,
        wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition, and
        wherein the change from the first time period to the second time period in the percentage of lift of the incremental sales volume includes a change from the first time period to the second time period in the incremental sales volume due to a change in the lift of the incremental sales volume per point of a discount of the merchandising condition.

9. A system for decomposing a sales volume for a product comprising:
    a processor;
    a storage device coupled to the processor; and software means located on the storage device and operative on the processor for:
        sending a request to a database for an amount of change from a first time period to a second time period in a sales volume condition of the product based on a merchandising condition of the product;
        determining, based on the amount of change, a change from the first time period to the second time period in an incremental volume of the product due to the amount of change in the sales volume condition of the product, wherein the incremental volume measures a portion of a total sales volume of the product that was achieved because the product was subject to the merchandising condition;
        generating a list of causal factors affecting the change in the incremental volume of the product due to the amount of change in the sales volume condition; and
        displaying the change in the incremental volume of the product due to the amount of change in the sales volume condition of the product and the list of causal factors affecting the change in the incremental volume of the product,
        wherein the sales volume condition is selected from the group consisting of a change from the first time period to the second time period in a base sales volume of the product exposed to the merchandising condition, a change from the first time period to the second time period in a percentage of the base sales volume of the product that is exposed to the merchandising condition and a change from the first time period to the second time period in a percentage of lift of the incremental sales volume due to the base sales volume of the product being exposed to the merchandising condition.

10. The system of claim 9, wherein the change from the first time period to the second time period in the percentage of lift of the incremental sales volume includes a change from the first time period to the second time period in the incremental sales volume due to a change in a depth of discount of the merchandising condition.

11. The system of claim 9, wherein the change from the first time period to the second time period in the percentage of lift of the incremental sales volume includes a change from the first time period to the second time period in the incremental sales volume due to a change in the lift of the incremental sales volume per point of a discount of the merchandising condition.

12. A computer-implemented method of decomposing a sales volume for a product, the method comprising:
    requesting, from a database, sales volume information pertaining to a first time period and a second time period, for a product that was exposed to one or more merchandising conditions;
    determining, based on the sales volume information, an incremental volume-related measure which indicates an incremental volume change for the product across the first time period and the second time period, wherein the incremental volume-related measure is a measure from a group of measures which includes
        a first incremental volume change due to a change in a base volume being exposed to the one or more merchandising conditions,
        a second incremental volume change due to a change in a percent of the base volume being exposed to the one or more merchandising conditions,
        a third incremental volume change due to a change in a percent lift of the incremental volume due to the base volume being exposed to the one or more merchandising conditions,
        a fourth incremental volume change due to a change in a depth of discount of the one or more merchandising conditions, and
        a fifth incremental volume change due to a change in an effectiveness of the depth of discount of the one or more merchandising conditions, and wherein the first incremental volume change is determined by
- determining a difference between a first base volume in the first time period and a second base volume in the second time period; and
- multiplying the difference by
  - a percent of the second base volume that was exposed to the one or more merchandising conditions, and
  - a percent increase in the incremental volume due to the second base volume exposure to the one or more merchandising conditions.

13. The computer-implemented method of claim 12, further comprising determining additional first incremental volume changes by varying the first base volume.

14. A computer-implemented method of decomposing a sales volume for a product, the method comprising:
- requesting, from a database, sales volume information pertaining to a first time period and a second time period, for a product that was exposed to one or more merchandising conditions;
- determining, based on the sales volume information, an incremental volume-related measure which indicates an incremental volume change for the product across the first time period and the second time period, wherein the incremental volume-related measure is a measure from a group of measures which includes
  - a first incremental volume change due to a change in a base volume being exposed to the one or more merchandising conditions,
  - a second incremental volume change due to a change in a percent of the base volume being exposed to the one or more merchandising conditions,
  - a third incremental volume change due to a change in a percent lift of the incremental volume due to the base volume being exposed to the one or more merchandising conditions,
  - a fourth incremental volume chance due to a change in a depth of discount of the one or more merchandising conditions, and
  - a fifth incremental volume change due to a change in an effectiveness of the depth of discount of the one or more merchandising conditions, and wherein the second incremental volume change is determined by
- determining a difference between a percent of a first base volume in the first time period that is exposed to the one or more merchandising conditions and a percent of a second base volume in the second time period that was exposed to the one or more merchandising conditions; and
- multiplying the difference by
  - the first base volume, and
  - an average of a first percent increase in the incremental volume due to the first base volume exposure to the one or more merchandising conditions in the first time period and a second percent increase in the incremental volume due to the second base volume exposure to the one or more merchandising conditions in the second time period.

15. The computer-implemented method of claim 14, further comprising determining additional first incremental volume changes by varying the percent of the first base volume.

16. A computer-implemented method of decomposing a sales volume for a product, the method comprising:
- requesting, from a database, sales volume information pertaining to a first time period and a second time period, for a product that was exposed to one or more merchandising conditions;
- determining, based on the sales volume information, an incremental volume-related measure which indicates an incremental volume change for the product across the first time period and the second time period, wherein the incremental volume-related measure is a measure from a group of measures which includes
  - a first incremental volume change due to a change in a base volume being exposed to the one or more merchandising conditions,
  - a second incremental volume change due to a change in a percent of the base volume being exposed to the one or more merchandising conditions,
  - a third incremental volume change due to a change in a percent lift of the incremental volume due to the base volume being exposed to the one or more merchandising conditions,
  - a fourth incremental volume change due to a change in a depth of discount of the one or more merchandising conditions, and
  - a fifth incremental volume change due to a change in an effectiveness of the depth of discount of the one or more merchandising conditions, and wherein the third incremental volume change is determined by
- determining a difference between a first percent increase in the incremental volume due to the first base volume exposure to the one or more merchandising conditions in the first time period and a second percent increase in the incremental volume due to the second base volume exposure to the one or more merchandising conditions in the second time period; and
- multiplying the difference by
  - an average of a percent of the first base volume that was exposed to the one or more merchandising conditions and a percent of the second base volume that was exposed to the one or more merchandising conditions, and
  - the second base volume in the second time period.

17. The computer-implemented method of claim 16, further comprising determining additional first incremental volume changes by varying the first percent of lift.

18. A computer-implemented method of decomposing a sales volume for a product, the method comprising:
- requesting, from a database, sales volume information pertaining to a first time period and a second time period, for a product that was exposed to one or more merchandising conditions,
- determining, based on the sales volume information, an incremental volume-related measure which indicates an incremental volume change for the product across the first time period and the second time period, wherein the incremental volume-related measure is a measure from a group of measures which includes
  - a first incremental volume change due to a change in a base volume being exposed to the one or more merchandising conditions,
  - a second incremental volume change due to a change in a percent of the base volume being exposed to the one or more merchandising conditions,
  - a third incremental volume change due to a change in a percent lift of the incremental volume due to the base volume being exposed to the one or more merchandising conditions,
  - a fourth incremental volume change due to a change in a depth of discount of the one or more merchandising conditions, and a fifth incremental volume change due to a change in an effectiveness of the depth of discount of the one or more merchandising conditions, and wherein the fourth incremental volume change is determined by determining a difference between a first percent discount price in the first time period and a second percent discount price in the second time period; and multiplying the difference by an average of a first lift-to-discount ratio and a second lift-to-discount ratio, wherein the first lift-to-discount ratio is a first percent incremental lift divided by the first percent discount price in the first time period, and the second lift-to-discount ratio is a second percent incremental lift divided by the second percent discount price in the second time period, an average of a first percent of the first base volume that was exposed to the one or more merchandising conditions in the first time period and a second percent of the second base volume that was exposed to the one or more merchandising conditions in the second time period, and a first base volume in the first time period.

19. A computer-implemented method of decomposing a sales volume for a product, the method comprising:

requesting, from a database, sales volume information pertaining to a first time period and a second time period, for a product that was exposed to one or more merchandising conditions;

determining, based on the sales volume information, an incremental volume-related measure which indicates an incremental volume change for the product across the first time period and the second time period, wherein the incremental volume-related measure is a measure from a group of measures which includes a first incremental volume change due to a change in a base volume being exposed to the one or more merchandising conditions, a second incremental volume change due to a change in a percent of the base volume being exposed to the one or more merchandising conditions, a third incremental volume change due to a change in a percent lift of the incremental volume due to the base volume being exposed to the one or more merchandising conditions, a fourth incremental volume change due to a change in a depth of discount of the one or more merchandising conditions, and a fifth incremental volume change due to a change in an effectiveness of the depth of discount of the one or more merchandising conditions, and wherein the fifth incremental volume change is determined by determining a difference between a first lift-to-discount ratio and a second lift-to-discount ratio, wherein the first lift-to-discount ratio is a first percent incremental lift divided by the first percent discount price in the first time period, and the second lift-to-discount ratio is a second percent incremental lift divided by the second percent discount price in the second time period; and multiplying the difference by an average of a first percent discount price in the first time period and a second percent discount price in the second time period, an average of a first percent of the first base volume that was exposed to the one or more merchandising conditions in the first time period and a second percent of the second base volume that was exposed to the one or more merchandising conditions in the second time period, and a first base volume in the first time period.

\* \* \* \* \*